(12) United States Patent  
Zhou et al.

(10) Patent No.: US 7,240,050 B2
(45) Date of Patent: Jul. 3, 2007

(54) METHODS AND APPARATUS FOR GENERATING AUTOMATED GRAPHICS USING STORED GRAPHICS EXAMPLES

(75) Inventors: Michelle Xue Zhou, Briarcliff Manor, NY (US); Min Chen, Belmont, CA (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 10/758,546

(22) Filed: Jan. 14, 2004

(65) Prior Publication Data

US 2005/0154750 A1 Jul. 14, 2005

(51) Int. Cl.
G06F 17/30 (2006.01)
(52) U.S. Cl. .............................. 707/3; 707/6
(58) Field of Classification Search .................... 707/3, 707/6; 382/113, 109, 217
See application file for complete search history.

(56) References Cited

U.S. PATENT DOCUMENTS 5,764,518 A * 6/1998 Collins ........................ 700/95
6,766,055 B2 * 7/2004 Matsugu et al. ............ 382/173

OTHER PUBLICATIONS

M. Zhou et al., "Building a Visual Database for Example-Based Graphics Generation," Proc, IEEE Infom Vis, 8 pages, Oct. 2002.*
M. Zhou et al., "Applying Mechine Learning to Automated Information Graphics Generation," IBM System Journal, vol. 41, No. 3, p. 504-523, Sep. 2002.*
Singh et al. Automating the lexical and syntactic design of grpahical user interfaces: the UofA*UIMS, ACM transaction, vol. 10, Issue. 3, Jul. 1991, pp. 213-254.*
Fisher et al. Intergrating automated test generation into the WYSIWYT spreadsheet testing methodology, ACM Transaction of Software engineering and Methodology, vol. 5, Issue 2, Apr. 2006, pp. 150-194.*
K, Börner, "Efficient Case-Based Structure Generation for Design Support," AI Review, vol. 16, pp. 87-118, Oct. 2001.
M. Chuah et al., "Sketching, Searching, and Customizing Visualizations: a Content-Based Approach to Design Retrieval," Intelligent Multimedia Information Retrieval, AAAI/MIT, pp. 1-33, 1997.
J.D. Mackinlay, "Automating the Design of Graphical Presentations of Relational Information," ACM Transactions on Graphics, vol. 5, pp. 1-34, Apr. 1986.
M. Zhou, "Visual Planning: A Practical Approach to Automated Presentation Design," Proc. of IJCAI, 8 pages, 1999.
M. Zhou et al., "Building a Visual Database for Example-Based Graphics Generation," Proc. IEEE Info Vis, 8 pages, Oct. 2002.
M. Zhou et al., "Applying Machine Learning to Automated Information Graphics Generation," IBM Systems Journal, vol. 41, No. 3, pp. 504-523, Sep. 2002.

* cited by examiner

Primary Examiner—John E. Breene
Assistant Examiner—Baoqquoc N. To
(74) Attorney, Agent, or Firm—Ryan, Mason & Lewis, LLP

(57) ABSTRACT

A technique is provided for generating automated graphics in response to a user request. A measure of similarity between the user request and one or more stored graphics examples is determined. At least one stored graphics example is obtained based on the similarity measure. Graphics are created from the at least one obtained graphics example and the user request.

31 Claims, 8 Drawing Sheets

METHODS AND APPARATUS FOR GENERATING AUTOMATED GRAPHICS USING STORED GRAPHICS EXAMPLES

FIELD OF THE INVENTION

The present invention is related to a technique for automated graphics generation and, more particularly, for the automated generation of graphics from a user request and stored graphics examples.

BACKGROUND OF THE INVENTION

Visual illustrations, including graphs, charts, and diagrams, have been used for centuries to facilitate human comprehension of information. For example, a line chart may be used to help people understand the trend of the real estate market for a particular area, or a scatter plot may be used to describe the population distribution for a specific geographical region.

A number of commercial illustration systems, such as ADOBE ILLUSTRATOR™ and MICROSOFT POWERPOINT™, help users create visual illustrations. Although these systems may provide different visual style sheets to their users (e.g., different chart styles provided by POWERPOINT™), the users are still required to craft their intended visual illustrations by hand. For example, users must decide which visual structures are best for their data (e.g., bar chart vs. pie chart), and determine what visual details are suitable to encode different types of information (e.g., using color to encode categorical data vs. using size to encode numerical data). Hand-crafting visual illustrations may be a difficult and time-consuming task when a user has not had training in visual design.

To support the dynamic design of customized visual illustrations, an area of research, known as automated graphics generation has emerged. The key challenge in developing an automated graphics generation system is determining how to automatically map a set of design requirements (input parameters) onto a set of visual metaphors and their structures, which constitute the intended visual illustration. The design requirements include everything that may impact the outcome of a desired visual illustration, including the underlying characteristics of the data to be visualized, user tasks, device capabilities, and user preferences. On the other hand, the visual metaphors and their compositions may include visual objects at multiple levels of abstraction, ranging from high-level schematic structures, such as charts and diagrams, to lowest level visual primitives, such as color and size.

To help automatically establish such a mapping, existing work has focused on employing a rule-based approach. Given a set of data entities, a rule-based approach employs hand-crafted design rules to map design requirements (e.g., data to be conveyed and the user goals) onto proper visual metaphors/structures. Nevertheless, the rule-based approaches present several major problems.

First, acquiring design rules manually is difficult. Hand-crafting design rules can be laborious as experts may need to process large amounts of evidence before extracting rules.

Second, maintaining and extending a large rule base is difficult. As the rule base grows, it is difficult to integrate new rules with existing rules, and discover/rectify inconsistencies among the rules.

Third, since rules normally are an abstraction of well-formed design patterns, it may be very difficult to use rules to capture various subtle and creative design features rendered by different design experts/artists.

In addition, existing generation systems directly provide users with a final presentation (e.g., a bar chart created for displaying quarterly sales data) for a given user request (e.g., displaying sales data) without involving users in the design process. Because of the abstract nature of rules and a lack of user intervention, the resulting illustrations may not be what a user desires.

Thus, there exists a need for techniques which overcome the drawbacks associated with the approaches described above, as well as drawbacks not expressly described above, and which thereby provide more efficient and scalable solutions to the problems associated with automated graphics generation.

SUMMARY OF THE INVENTION

The present invention provides techniques for automated graphics generation and, more particularly, for automated generation of graphics from a user request and stored graphics examples.

For example, in one aspect of the invention, a technique for generating automated graphics in response to a user request comprises a measure of similarity between the user request and one or more stored graphics examples is determined. At least one stored graphics example is obtained based on the similarity measure. Graphics are created from the at least one obtained graphics example and the user request.

Advantageously, the invention may provide a case-based learning model, apparatus, and framework that enables a domain-independent, extensible solution to building automated graphic sketch generation applications and components. The result is that the users can focus on tasks and data but not on visual design details. Additionally, the invention may encourage a user to get involved in the visual illustration creation process so that illustrations tailored to their individual preferences may be obtained.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary data processing system architecture. It should be understood, however, that the invention is not limited to use with any particular system architecture. The invention is instead more generally applicable to any data processing system in which it is desirable to perform efficient, effective, and scalable automated graphics generation.

As will be illustrated in detail below, the present invention introduces a technique for automatically generating graphics, and more particularly, for automatically generating graphics from a user request and stored graphics examples. The term "graphics" as used herein is intended to be synonymous with the phrase "one or more graphic sketches" or merely "graphic sketch."

Figure 1:
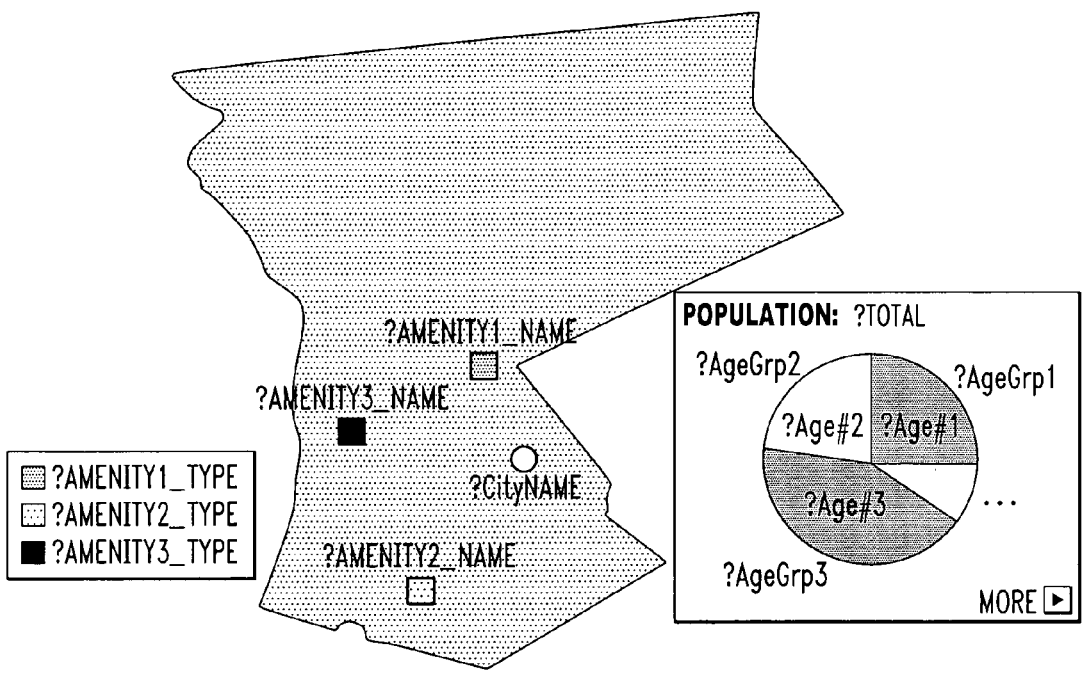
FIG. 1 illustrates an automatically generated graphic sketch having uninstantiated variables, according to an embodiment of the present invention.

Inventive techniques of the present invention provide methods, systems, and apparatus for developing user-system collaborative, automated graphic sketch generation components. The term "sketch" as used herein is intended to include an outline of a graphical presentation without all the precise visual details. An example of such a sketch is shown in FIG. 1, which illustrates an automatically generated graphic sketch having uninstantiated variables. To overcome the limitations of rule-based automated graphic sketch generation approaches, which require the formation of a complete and consistent set of graphic design rules, embodiments of the present invention include a case-based learning approach to enable automated graphic sketch generation by utilizing abundant, stored cases. The term "stored graphics example" is intended to be synonymous with the term "case," which may also consist of stored pattern and illustration examples. Given a user request, a similarity metric retrieves stored cases from a visual database that are most similar to the request. The retrieved cases are then directly reused for or adapted to the new situation (e.g., new data).

Figure 2:
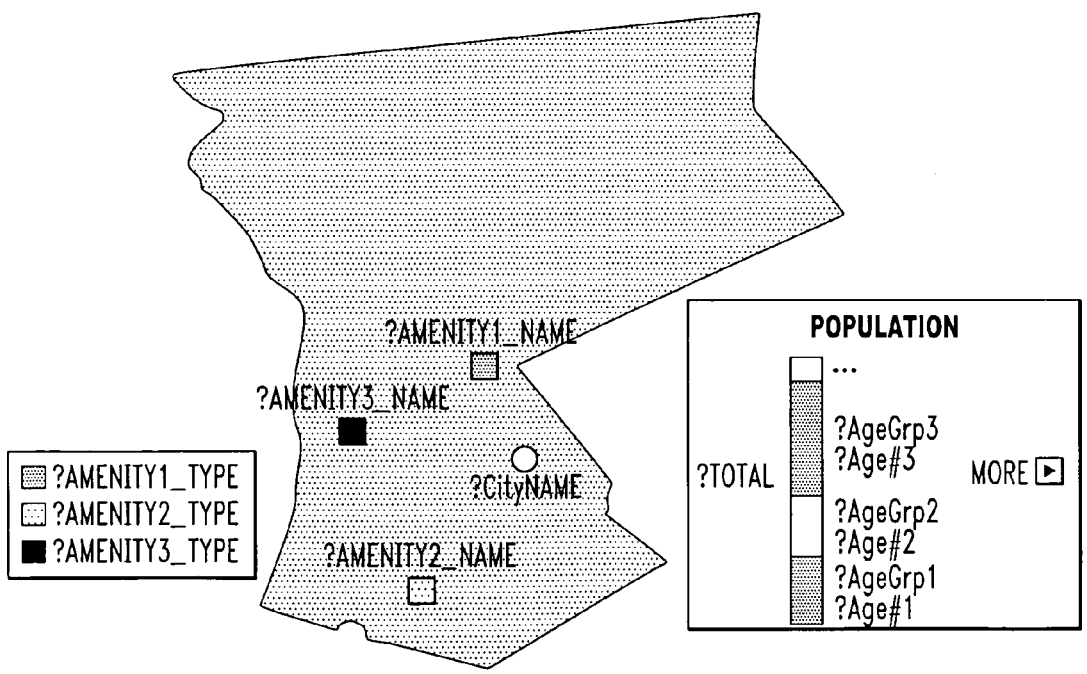
FIG. 2 illustrates an automatically generated alternative graphic sketch having uninstantiated variables, according to an embodiment of the present invention.

Embodiments of the present invention may stand alone or be embedded in other applications. For example, they may become part of a multimedia application to help automatically generate the system's visual responses. Using FIGS. 1 and 2 as examples, upon a user's request to create a graphic sketch for visualizing particular city information, an application presents users with the top-matched stored cases from a visual database. By adapting the matched cases, a new graphic sketch is synthesized as shown in FIG. 1. If the user chooses to use a different set of stored cases, an alternate new graphic sketch may be created for the same request, as shown in FIG. 2. The generated sketch or its alternatives are then presented to the users for their feedback. Depending on the feedback, such applications may redesign the sketch or refine it to create a final graphic sketch. By allowing users to critique a sketch, automated graphical sketch generation applications can inexpensively fine-tune an undesirable design. Once a graphic sketch is created, it is stored in the case database so that it may be used later to create other graphic sketches.

Figure 3:
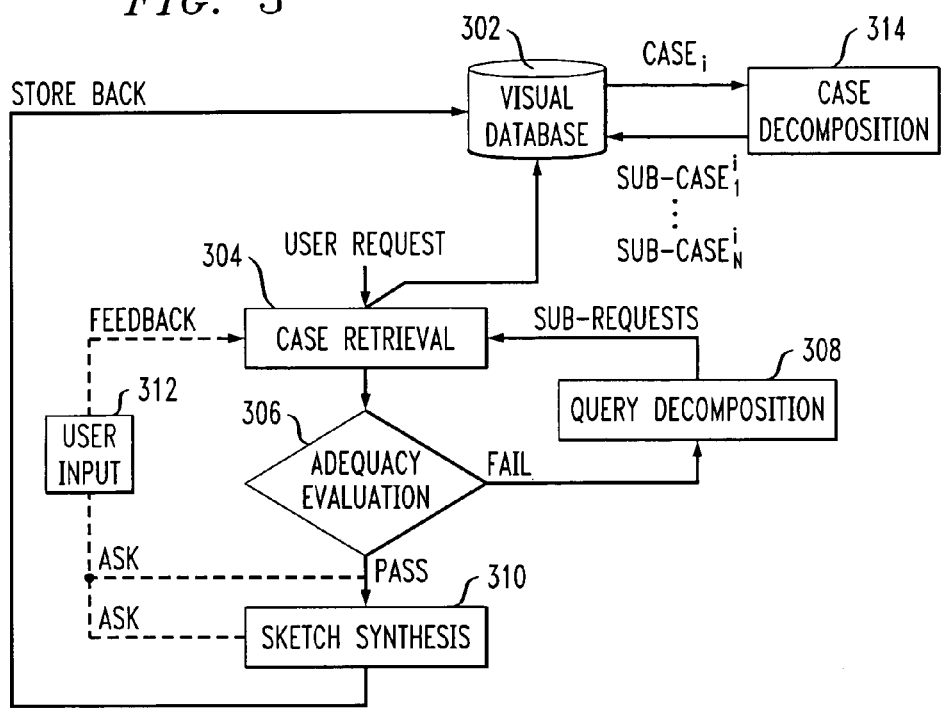
FIG. 3 is a flow diagram illustrating a case-based automated graphic sketch generation methodology, according to an embodiment of the present invention.

Referring now to FIG. 3, a flow diagram illustrates a case-based automated graphic sketch generation methodology, according to an embodiment of the present invention. A model of the present invention uses a visual database 302 of stored cases to suggest new designs for a new user request. To create effective visual illustrations, the quality of cases is important. Hence, normally cases in database 302 are illustration samples that are created by design experts/artists (e.g., illustrations published in design magazines or newspapers). Given a user request, a stored case retrieval component 304 first uses a similarity metric to retrieve the top-matched cases by computing the similarity distances between the request and stored cases in visual database 302. A top-matched case is the case that has the shortest similarity distance to the request. An example of a similarity measure is a weighted sum of pair-wise distances of corresponding features extracted from the user request and the stored cases.

The top-matched cases are then sent to an adequacy evaluation component 306 to be judged whether the retrieved cases can be used for synthesizing new examples. If a top-matched case fails the adequacy test, the current request is sent to a query decomposition component 308 to be decomposed into a set of sub-requests. The technique is then repeated to find the top-matched case for each sub-request. After passing adequacy evaluation component 306, retrieved top matches/sub-matches are sent to a sketch synthesis component 310 to create a new sketch either from a single matched case or from multiple cases. The resulting sketch is presented to the user in response to the user request and is stored in database 302 as an example that may be used for a new user request.

This methodology also allows user input at different design stages through a user input component 312. For example, users may express their preferences to retrieve more desired cases or propose alternative visual compositions during sketch synthesis. Further, since a user request is often partially specified, it is rare to find an exact match between the request and a case. A case decomposition component 314 decomposes a case into smaller fragments, allowing a request to match a fragment of a case. The granularity of the decomposition is controlled so that there are enough sub-cases to match user requests accurately, but not too many fragmented cases that produce potentially too large a search space.

Figure 4:
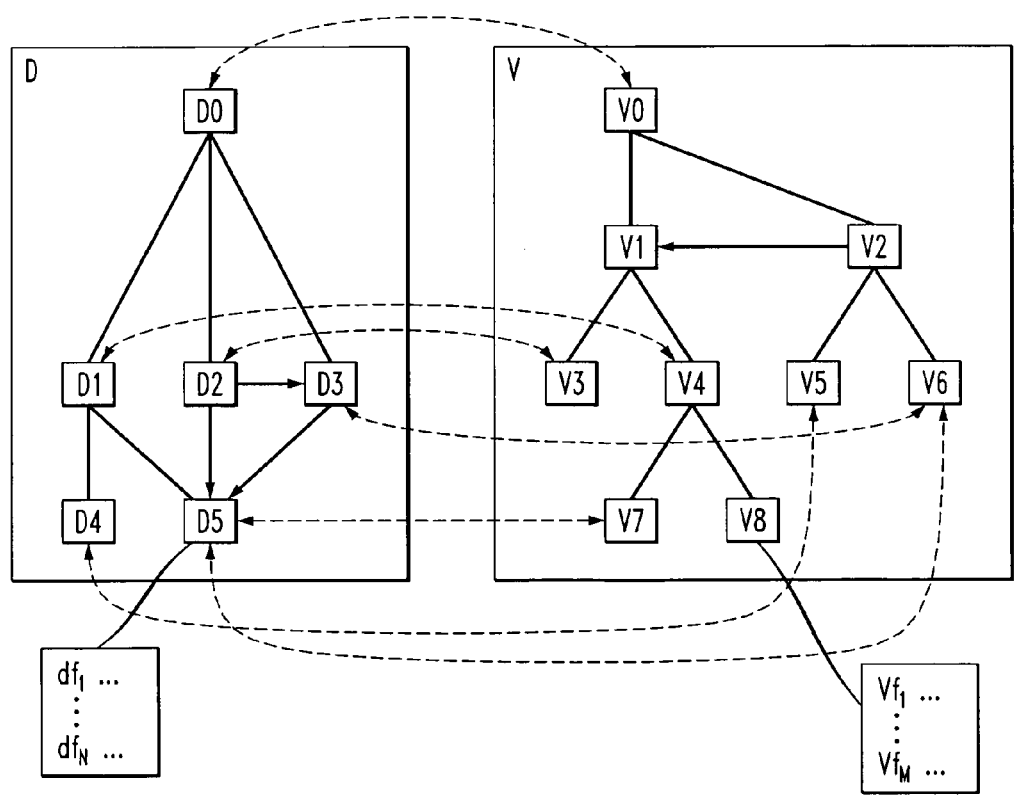
FIG. 4 is a diagram illustrating a stored case, according to an embodiment of the present invention.

Referring now to FIG. 4, a diagram illustrates a stored case, according to an embodiment of the present invention. A labeled graph structure is used to represent each case stored in database 302 of FIG. 3, by describing its data content D and visual representation V. Similarly, this structure is used to describe each user request, where normally data D is specified, and its desired visualization V may be partially or not specified at all. Each graph node (e.g., D0 or V0) represents a component of D (e.g., price attribute of a house) or V (e.g., a color of a visual object), and each edge represents the relations between the components. As shown in the figure, each node is further described using a set of features (e.g., features Df for data, and Vf for visual).

Variations of representation formalisms, such as a simple flattened feature vector, may also be used to represent the characteristics of a stored case or a user request.

Figure 5:
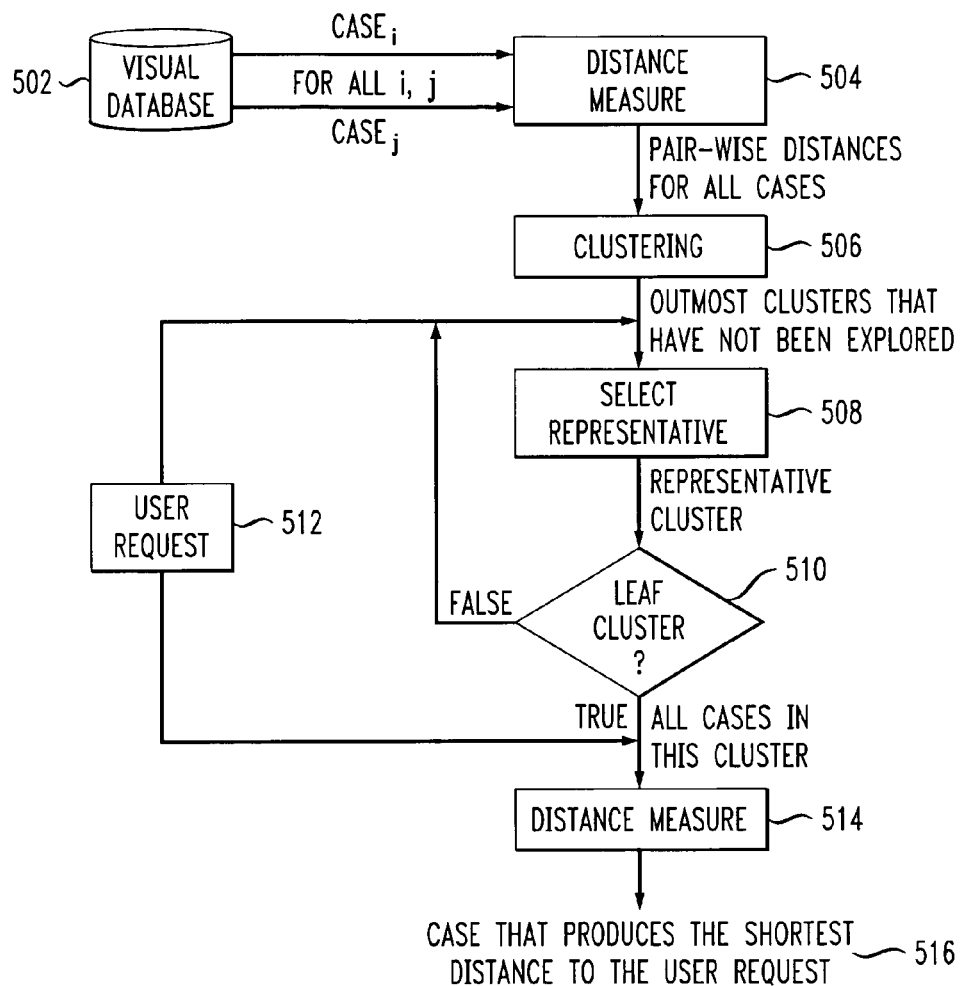
FIG. 5 is a flow diagram illustrating a stored case retrieval methodology, according to an embodiment of the present invention.

Referring now to FIG. 5, a flow diagram illustrates a stored case retrieval methodology, according to an embodiment of the present invention. FIG. 5 may be considered a detailed description of case retrieval component 304 of FIG. 3. The inventive technique finds the top-matched stored case using a distance measurement and a hierarchical cluster-based search method. Starting from a visual database 502, the pair-wise distances for the cases in database 502 are computed in block 504 using a similarity metric. There are many ways to define such a similarity metric. One example is to use a similarity metric for comparing two graphs, which will be translated into comparing the corresponding nodes and edges of the graphs, such as the one shown in FIG. 4.

Figure 6:
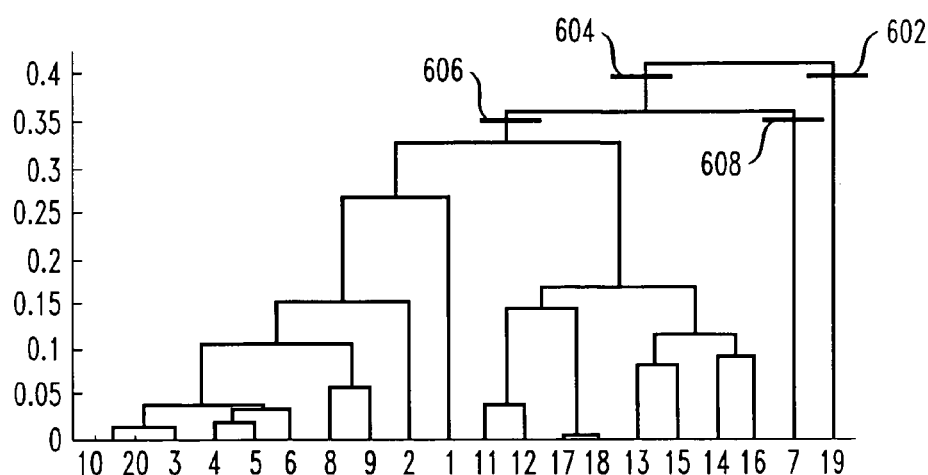
FIG. 6 is a diagram illustrating a resulting cluster hierarchy, according to an embodiment of the present invention.

A hierarchical clustering technique is used to arrange stored cases by their pair-wise distances into hierarchical clusters in block 506. FIG. 6 is a diagram illustrating a resulting cluster hierarchy. Starting with the two outermost clusters in the hierarchy, clusters 602 and 604 of FIG. 6, one cluster is searched that is most likely to contain the top-matched case. To find a cluster to search, a representative case from each cluster is selected using a quick approximation in block 508. Selecting such a representative may be achieved, for example, by using the meta properties of corresponding graphs, such as the total number of nodes, the average number of levels, and the average number of nodes at each level. The cluster whose representative case produces the shortest similarity distance to the request is selected. The top-matched case for a request is likely to be in the same cluster of cases having the closest match to the request by both meta property and similarity metric standards.

The selected cluster is tested to determine whether it is a leaf cluster in block 510. A leaf cluster has no other clusters within it. If it is not a leaf cluster, for example, cluster 604 in FIG. 6, the technique continues down the hierarchy (e.g., to clusters 606 and 608 of FIG. 6). After finding new clusters further down the hierarchy, the case retrieval methodology returns to block 508. This process repeats until a leaf cluster is explored. The similarity distances are then computed for a given leaf cluster between user request 512 and the cases within this cluster in block 514. A case 516 that has produced the shortest distance to the request is finally output and the methodology terminates.

This cluster-guided search performs better than a linear search (i.e., searching through the database one by one). Unlike other structured case searches, where cluster representatives are pre-selected in advance, a representative in the methodology of the present invention is chosen dynamically for each user request to achieve a more accurate retrieval in block 304 of FIG. 3.

Figure 7:
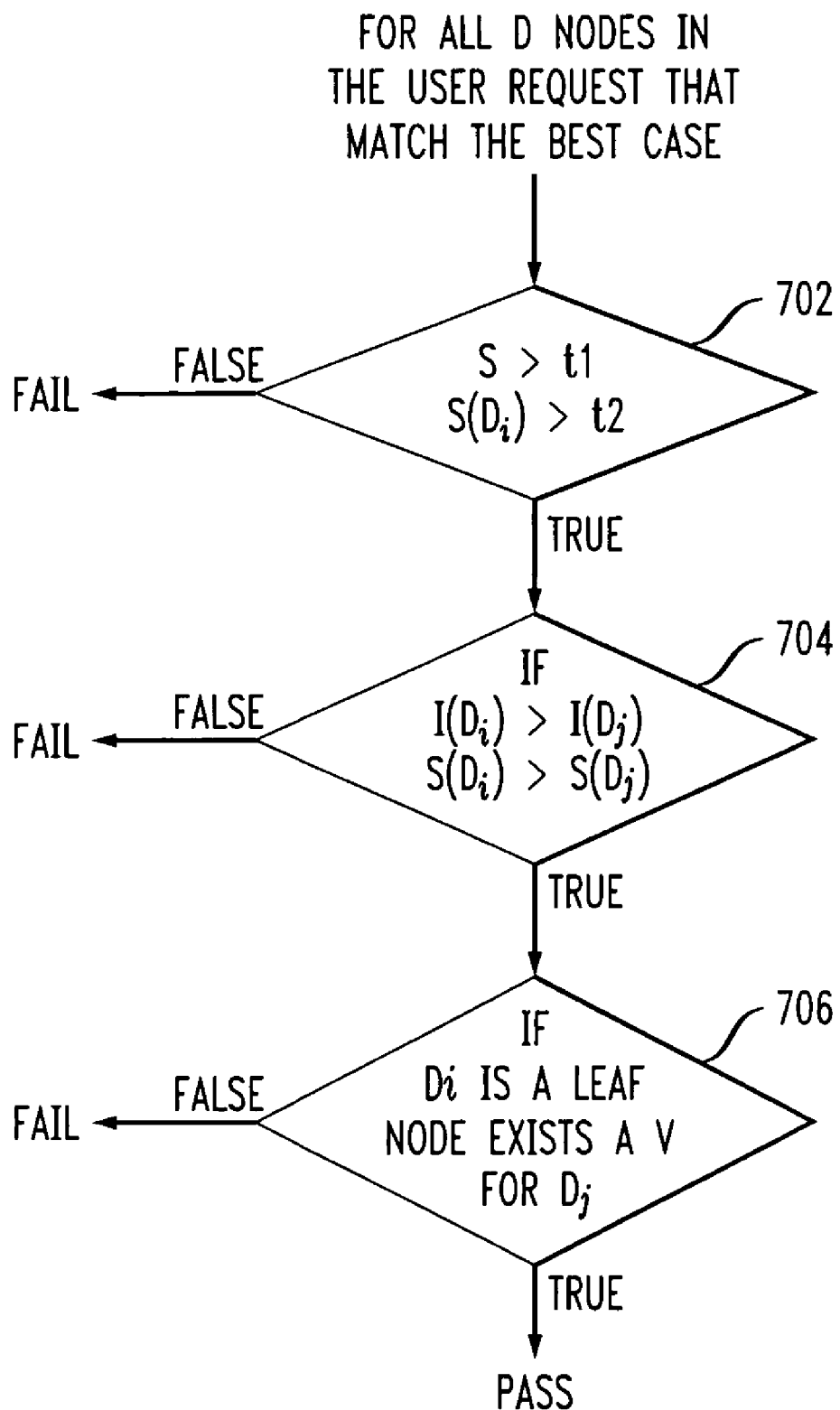
FIG. 7 is a flow diagram illustrating an adequacy evaluation methodology, according to an embodiment of the present invention.

Referring now to FIG. 7, a flow diagram illustrates an adequacy evaluation methodology, according to an embodiment of the present invention. FIG. 7 may be considered a detailed description of adequacy evaluation component 306 of FIG. 3. For many reasons, a top-matched case may be inadequate for creating an effective sketch. The methodology illustrates three criteria to rule out unusable cases. Additional criteria can be easily added to further discern whether top-matched cases are adequate in synthesizing a new sketch.

First, the methodology determines whether a top-matched case produces a good overall match and also good matches for data nodes in the request in block 702 to ensure that the new graphic sketch can visualize every piece of data properly. S is the overall matching score between the user request and the top-matched case; $S(D_i)$ is the matching score produced for node $D_i$ in the user request during the similarity measuring technique; and $t_1$ and $t_2$ are thresholds that measure how good a match is. The thresholds may be obtained by conducting a series of case retrieval experiments. For example, the threshold may be set to 0.7 on a [0, 1] scale (i.e., 0 means there is no match at all, 1 denotes an exact match), which proves to be a good indicator for creating a quality new graphic sketch.

Second, the methodology determines whether important data is better represented than less important data in the graphic sketch in block 704. An example of such a test is determining whether the matching scores for more important data relations are higher than those scores for less important data. $I(D_i)$ is the importance of an important data node $D_i$, and $S(D_i)$ is the matching score for $D_i$. $I(D_j)$ is the importance of a less important data node $D_j$, and $S(D_j)$ is the matching score for $D_j$. Data importance may be determined by using matching priorities specified in a user request. For example, a user may specify that visualizing certain data attributes may be more important than others.

Third, to guarantee that a new sketch can be synthesized, the methodology tests whether every data leaf node in a request has acquired a visual candidate in block 706. Normally sketch synthesis is a bottom-up process, where visual primitives are formed first then percolate to the top to build more complex visual structures. The sketch synthesis would fail without the basic building blocks. To introduce these building blocks, every data leaf node in a request obtains a visual candidate. If each of the three tests are passed, the stored case passes the adequacy evaluation component 306 of FIG. 3 and continues to sketch synthesis component 310. However, if the stored case fails any one of the above tests, the methodology of FIG. 3 continues to request decomposition 308.

Figure 8:
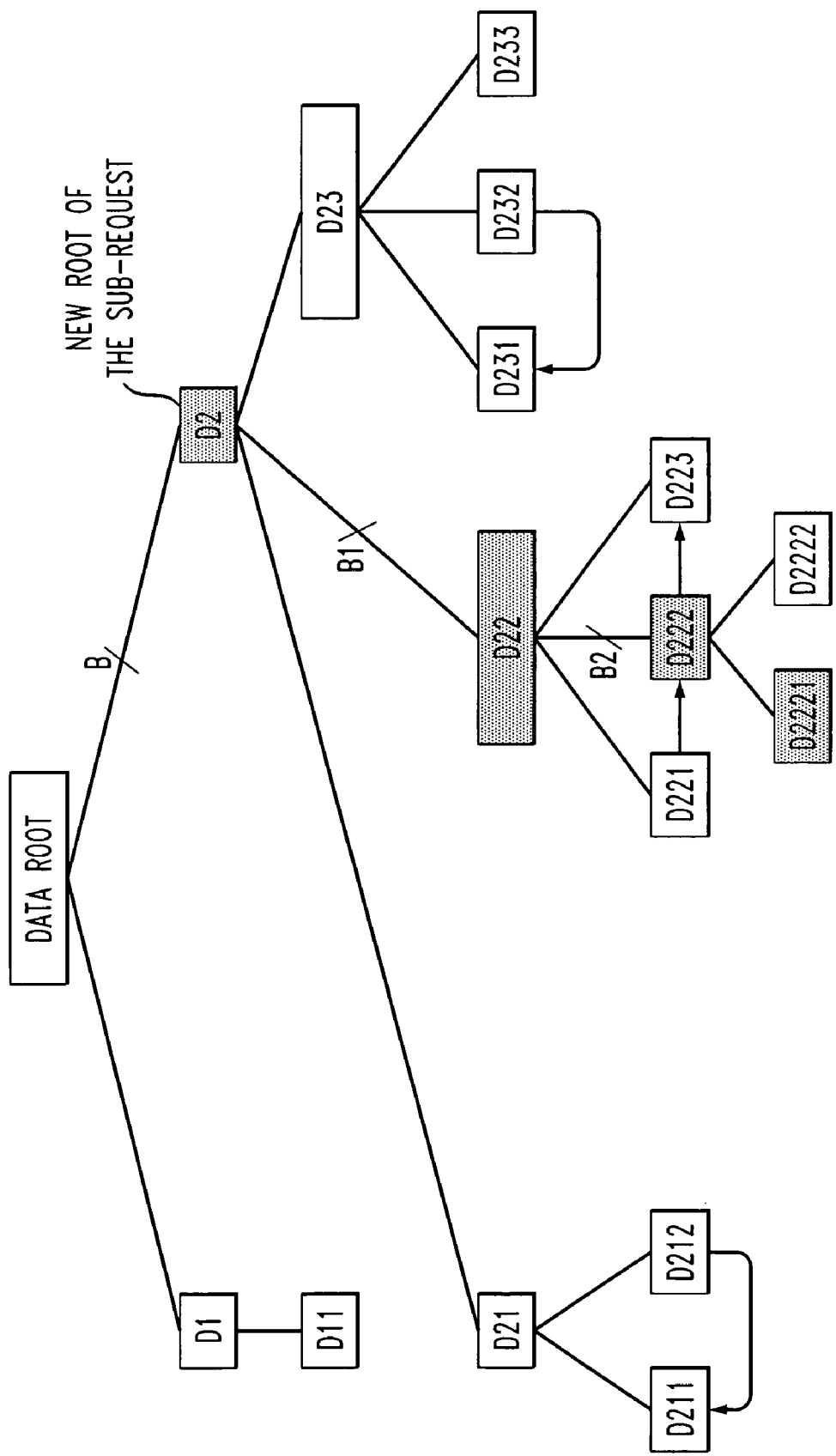
FIG. 8 is a diagram illustrating user request decomposition, according to an embodiment of the present invention.

Referring now to FIG. 8, a diagram illustrates user request decomposition. FIG. 8 may be considered a detailed description of query decomposition component 308 in FIG. 3. When a retrieved top-matched case fails the adequacy evaluation, the user request needs to be decomposed into smaller pieces in hope of finding better matches. To ensure the retrieval quality without incurring the expense of rematching, an embodiment of the present invention extracts the failed fragments as sub-requests, while retaining the results for succeeded ones. Starting from the bottom of a graph, assuming that D2221 fails the adequacy evaluation, then its parent D222 fails as well. This failure is propagated to the top until it reaches node D2.

There are many possibilities as to what the sub-request should contain. For example, branches B1, B2, and B can all be considered potential sub-requests. Since sub-requests break up the original structure of a request, it is desirable not to produce too many sub-requests. This implementation of the present invention forms a sub-request by extracting the biggest possible branch (e.g., branch B including the node D2). Depending on the matching results, this inventive technique may be repeated until sub-requests contain a single node. Cases that match these single-node requests can be found in the visual dictionary formed from case decomposition described below. Request decomposition enables the discovery of desired case fragments from a set of heterogeneous cases, where other approaches may fail (e.g., finding a maximal common sub-graph approach). Unlike a static request decomposition used by others, an inventive technique of the present invention supports a dynamic decomposition based on adequacy evaluation results.

Figure 9A:
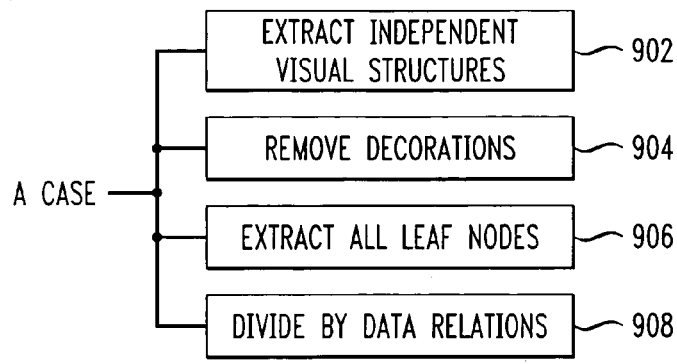
FIG. 9a is a flow diagram illustrating a case decomposition methodology, according to an embodiment of the present invention.
Figure 9B:
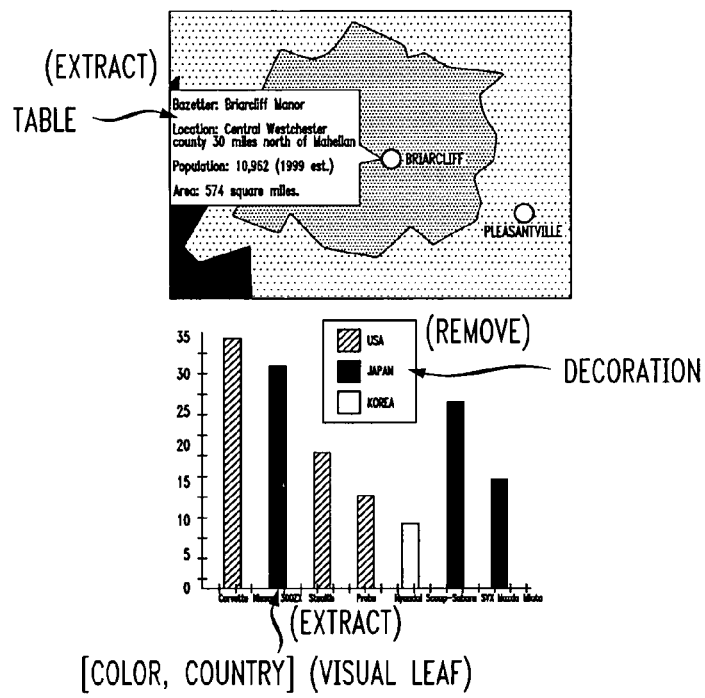
FIGS. 9b and 9c are diagrams illustrating examples of case decomposition.
Figure 9C:
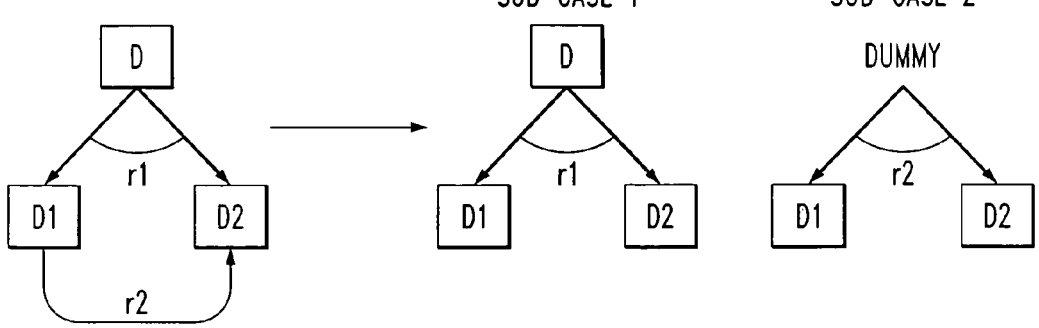

Referring now to FIG. 9a, a flow diagram illustrates a case decomposition methodology. FIG. 9a may be considered a detailed description of case decomposition component 314 of FIG. 3. The methodology improves the matching speed and accuracy of the present invention by creating sub-cases. There are several ways to extract sub-cases from a case. First, independent and meaningful visual structures are extracted to form a sub-case in block 902. These visual structures are schematic cases for conveying concepts and processes, for example, the table showing the city information in a map-based illustration in FIG. 9b. Second, sub-cases are created by trimming all decorations from the case in block 904 (e.g., coordinate axes and legends in the bar chart in FIG. 9b). These simplified sub-cases are good matching candidates for most user requests, which normally do not specify the data for creating visual decorations. Third, visual leaf objects are extracted along with their data mappings from cases to form a visual dictionary in block 906. The dictionary is used to find matches for user requests that have been decomposed until they contain a single node. For example, a visual leaf in the bar chart is considered the visual primitive color, which is used to encode the country information in FIG. 9b. Fourth, a case is decomposed by data relations in block 908. FIG. 9c gives an example of two data relations (r1 and r2), which produce two sub-cases.

There are many other ways to extract sub-cases from a case. Case decomposition is based on the representation of the cases (e.g., the graph-based representation described in FIG. 4) instead of the raw images themselves, since existing image processing techniques are not adequate to identify the desired semantic relations and structures.

Figure 10:
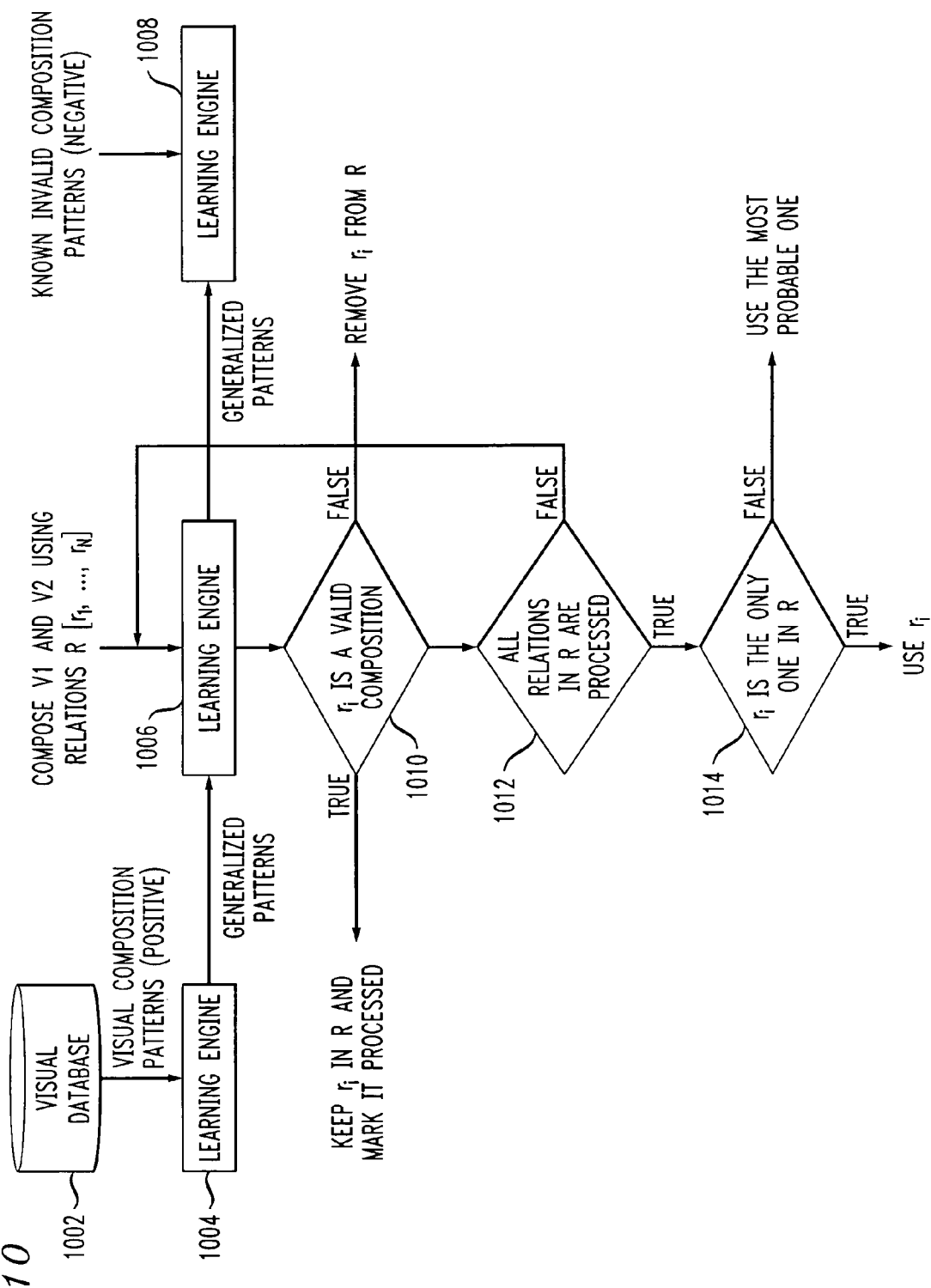
FIG. 10 is a flow diagram illustrating a graphic sketch synthesis methodology, according to an embodiment of the present invention.

Referring now to FIG. 10, a flow diagram illustrates a sketch synthesis methodology, according to an embodiment of the present invention. FIG. 10 may be considered a detailed description of sketch synthesis component 310 of FIG. 3. The methodology creates a new sketch from a single or multiple retrieved cases. The technique of synthesizing a new graphic sketch from stored cases is to piece together matched visual elements. Since visual elements from different retrieved cases are allowed to be synthesized together, a particular composition of these visual components may not exist in stored cases. This is similar to synthesizing an English sentence from multiple existing sentences; certain combinations may be invalid. Moreover, multiple visual compositions may be proposed through different matching passes, e.g., a data node may participate in a whole case matching or in a sub-case matching.

A possible approach to validating a proposed visual composition is through case generalization. As shown in FIG. 10, a set of visual compositions R have been proposed for connecting visual components v1 and v2, which may be extracted from different cases. To validate the compositions in R, composition patterns are extracted from a visual database 1002 and sent to a first learning engine 1004 to generalize the composition patterns. The first learning engine can use different machine learning approaches, such as a decision-tree learning technique, to automatically induce a set of classification rules from visual composition patterns. A second learning engine 1006 is used to validate a new composition using the generalized patterns (e.g., classification rules). This may also be achieved by using first learning engine 1004. To compensate for the situation where there is a lack of visual composition patterns to start with, negative samples may be introduced that are known to be invalid to help identify invalid new compositions. Similar to the above technique, a third learning engine 1008 is used to generalize negative composition patterns. Using the negative generalizations, third learning engine 1008 can then verify invalid new compositions for elimination.

After both positive and negative verifications, if a composition $r_i$ is deemed valid, it is kept in R, otherwise, it is removed in block 1010. This technique continues until compositions in R are verified in block 1012. If there is one composition left in R, it is used to put v1 and v2 together in block 1014. Otherwise, the most probable one is chosen, for example, using the confidence factors generated in the decision-tree learning to select the most probable valid composition.

Figure 11:
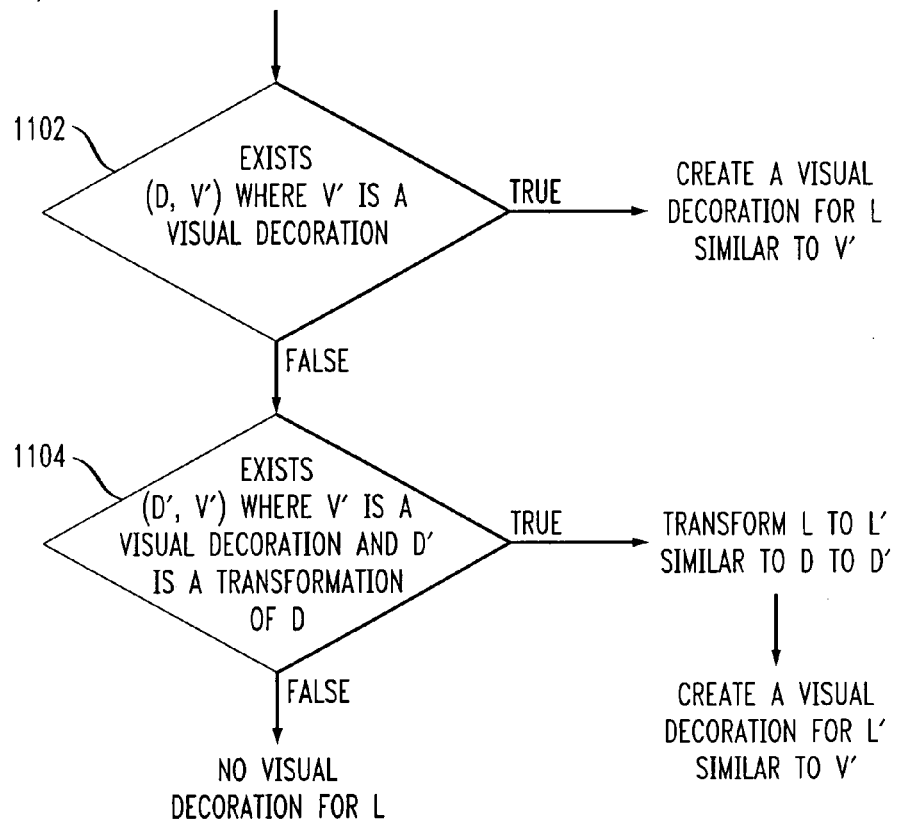
FIG. 11 is a flow diagram illustrating a visual decoration inference methodology implemented in graphic sketch synthesis, according to an embodiment of the present invention.

Referring now to FIG. 11, a flow diagram illustrates a visual decoration inference methodology implemented in sketch synthesis, according to an embodiment of the present invention. A sketch is incomplete without the necessary visual decorations, such as coordinate axes and legends, which can guide users to comprehend the information encoded in the case. However, in a request a user rarely specifies the data for creating such decorations. Starting with each leaf L in user request Q and its match (D, V) from a retrieved case C, the visual mappings of the matched data node D are traced in C. Within case C, if data D is used to create visual decorations, a visual decoration is created for L in the user request. More precisely, it is determined whether there exists a data-visual mapping pair (D', V') in case C, where D' is D, and V' is a visual decoration in block 1102. If such a pair exists, a visual decoration for L is created that is similar to V'. If such a pair does not exist, it is determined whether there exists a data visual mapping pair (D', V') in case C, where D' is a transformation of D in block 1104. If such a case exists, L is transformed to L' similar to D to D', and a visual decoration is created for L' that is similar to V'.

Besides leaf data nodes, other intermediate data nodes may also be used to infer visual decorations. However, using leaf nodes is perhaps the most efficient way since leaf nodes are directly associated with the actual data values (e.g., price values for cars). And normally visual decorations, such as legends and coordinate axes, are created for the purpose of helping users to interpret the actual data values (e.g., variations in the price values).

Figure 12:
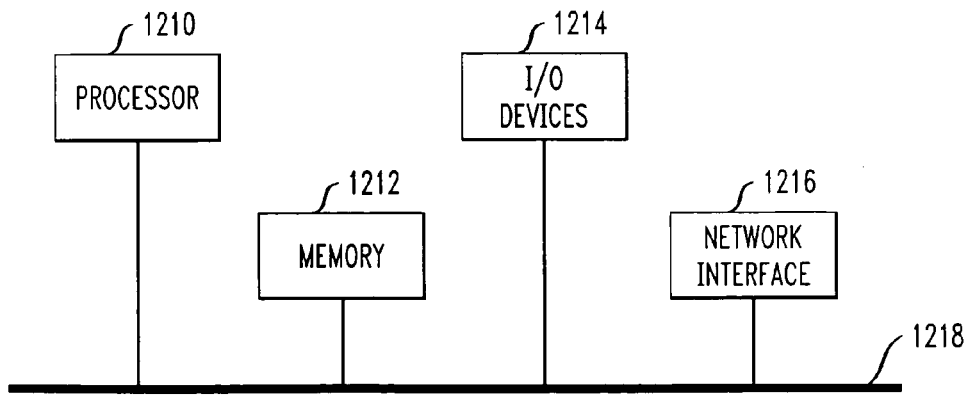
FIG. 12 is a diagram illustrating an illustrative hardware implementation of a computing system in accordance with which one or more components/methodologies of the present invention may be implemented, according to an embodiment of the present invention.

Referring now to FIG. 12, a block diagram illustrates an illustrative hardware implementation of a computing system in accordance with which one or more components/methodologies of the invention (e.g., components/methodologies described in the context of FIGS. 3, 5, 7, 9, 10 and 11) may be implemented, according to an embodiment of the present invention. For instance, such a computing system in FIG. 12 may contain visual database 302 and implement case retrieval component 304, adequacy evaluation component 306, query decomposition component 308, sketch synthesis component 310, case decomposition component 314 of FIG. 3.

As shown, the computer system may be implemented in accordance with a processor 1210, a memory 1212, I/O devices 1214, and a network interface 1216, coupled via a computer bus 1218 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit. User input 312 of FIG. 3 may be provided in accordance with one or more of the I/O devices.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of automated graphics generation in response to a user request comprising:
    determining a measure of similarity between the user request and one or more stored graphical examples to measure whether the one or more stored graphical examples are adequate for creating one or more new graphical illustrations in accordance with the user request;
    if the user request and the one or more stored graphical examples are similar, searching for at least one matching graphical example among the one or more graphical examples for the user request;
    if the user request and the one or more stored graphical examples are not similar, systematically decomposing the user request into sub-requests and the one or more stored graphical examples into graphical fragments in accordance with at least one of syntactic, semantic and pragmatic characteristics of the one or more graphical examples, and searching for at least one matching graphical fragment among the one or more graphical examples for the user request;
    composing the one or more new graphical illustrations from at least one of the at least one matching graphical example and the at least one matching graphical fragment, using a pattern-based composition; and
    storing the one or more composed graphical illustrations in a database for use by the user;
    wherein the determining, decomposing, searching and composing steps utilize a cooperative critiquing technique between a user and a system for automated graphics generation.

2. The method of claim 1, wherein the step of determining a measure of similarity comprises the step of:
    determining one or more adequacy criteria to measure whether the one or more stored graphical examples are adequate.

3. The method of claim 2, wherein determining whether the at least one graphical example is adequate comprises the steps of:
    determining whether important data is better represented in the graphics than less important data; and
    determining whether every data instance in the user request has acquired a visual candidate so that graphics are capable of being synthesized; and
    determining whether the one or more graphical examples can be instantiated using data in the user request.

4. The method of claim 1, wherein the step of systematically decomposing at least one graphical example comprises the steps of:
    extracting independent visual structures;
    removing decorations;
    extracting leaf nodes to form a visual dictionary; and
    dividing by data relations.

5. The method of claim 1, wherein decomposing at least one graphical example comprises using user-provided decomposition instructions that are at least one of provided by the user interactively during runtime or pre-stored in the system.

6. The method of claim 1, wherein the step of systematically decomposing at least one graphical example comprises the steps of:
    decomposing the user request based on data relations;
    decomposing a user request based on data groupings;
    decomposing a user request based on tasks and subtasks; and
    dynamically extracting fragments that failed to obtain a match during a case-based retrieval process.

7. The method of claim 1, further comprising providing user feedback while computing similarity measurements.

8. The method of claim 1, further comprising providing user feedback while creating graphics.

9. The method of claim 1, wherein searching for at least one stored graphical example comprises:
    arranging stored graphical examples into hierarchical clusters according to each computed similarity measurement;
    searching a cluster at a highest hierarchical level most likely to contain a top-matched graphical example having the greatest similarity measurement to the user request;
    determining a measure of similarity between the user request and each graphical example within the searched cluster; and
    outputting at least one graphical example of the searched cluster having the greatest similarity measurement.

10. The method of claim 9, further comprising:
    determining whether the searched cluster has no clusters inside it; and
    repeating the method of obtaining at least one stored graphical example with clusters at a highest hierarchical level inside the searched cluster, if there are clusters inside the searched cluster, until a cluster having no clusters inside it is found.

11. The method of claim 9, wherein searching a cluster comprises:
    selecting a representative graphical example from each cluster at the highest hierarchical level using an approximation; and
    selecting the cluster having the representative graphical example with the greatest similarity measurement to the user request.

12. The method of claim 11, wherein the approximation uses meta properties of the stored graphical examples.

13. The method of claim 1, wherein creating graphics comprises:
extracting at least one composition pattern from the database;
generalizing the at least one composition pattern;
determining whether at least one new composition is valid using at least one generalized composition pattern; and
selecting the most probable valid composition.

14. The method of claim 13, further comprising:
generalizing at least one negative composition pattern; and
determining whether at least one new composition is invalid using at least one generalized negative composition pattern.

15. The method of claim 1, wherein creating a new sketch comprises inferring visual decorations.

16. Apparatus for automatically generating graphics from a user request, the apparatus comprising:
a memory; and
at least one processor coupled to the memory and operative to: (i) determine a measure of similarity between the user request and one or more stored graphical examples to measure whether the one or more stored graphical examples are adequate for creating one or more new graphical illustrations in accordance with the user request; (ii) if the user request and the one or more stored graphical examples are adequately similar, search for at least one matching graphical example among the one or more graphical examples for the user request; (iii) if the user request and the one or more stored graphical examples are not adequately similar, systematically decompose the user request into subrequests and the one or more stored graphical examples into graphical fragments in accordance with at least one of syntactic, semantic and pragmatic characteristics of the one or more graphical examples, and searching for at least one matching graphical fragment among the one or more graphical examples for the user request, (iv) compose the one or more new graphical illustrations from at least one of the at least one matching graphical example and the at least one matching graphical fragment, using a pattern-based composition; and (v) store the one or more composed graphical illustration in a database for use by the user; wherein the determining, decomposing, searching and composing steps utilize a cooperative critiquing technique between a user and a system for automated graphics generation.

17. The apparatus of claim 16, wherein the processor is further operative to:
determine one or more adequacy criteria to measure whether the one or more stored graphical examples are adequate.

18. The apparatus of claim 17, wherein determining whether the at least one graphical example is adequate comprises:
determining whether important data is better represented in the graphics than less important data; and
determining whether every data instance in the user request has acquired a visual candidate so that graphics are capable of being synthesized; and
determining whether the one or more graphical examples can be instantiated using data in the user request.

19. The apparatus of claim 16, wherein systematically decomposing at least one graphical example comprises:
extracting independent visual structures;
removing decorations;
extracting leaf nodes to form a visual dictionary; and
dividing by data relations.

20. The apparatus of claim 16, wherein decomposing at least one graphical example comprises using user-provided decomposition instructions that are at least one provided by the user interactively during runtime or pre-stored in the system.

21. The apparatus of claim 16, wherein decomposing at least one graphical example comprises:
decomposing the user request based on data relations;
decomposing the user request based on data groupings;
decomposing the user request based on tasks and subtasks; and
dynamically extracting fragments that failed to obtain a match during a case-based retrieval process.

22. The apparatus of claim 16, wherein the processor is further operative to provide user feedback while computing similarity measurements.

23. The apparatus of claim 16, wherein the processor is further operative to provide user feedback while creating graphics.

24. The apparatus of claim 16, wherein the obtaining at least one stored graphical example comprises the operations of:
arranging stored graphical examples into hierarchical clusters according to each computed similarity measurement;
searching a cluster at a highest hierarchical level most likely to contain a top-matched graphical example having the greatest similarity measurement to the user request;
determining a measure of similarity between the user request and each graphical example within the searched cluster; and
outputting at least one graphical example of the searched cluster having the greatest similarity measurement.

25. The apparatus of claim 23, further comprising the operations of:
determining whether the searched cluster has no clusters inside it; and
repeating the method of obtaining at least one stored graphical example with clusters at a highest hierarchical level inside the searched cluster, if there are clusters inside the searched cluster, until a cluster having no clusters inside it is found.

26. The apparatus of claim 23, wherein the searching a cluster comprises the operations of:
selecting a representative graphical example from each cluster at the highest hierarchical level using an approximation; and
selecting the cluster having the representative graphical example with the greatest similarity measurement to the user request.

27. The apparatus of claim 26, wherein the approximation uses meta properties of the stored graphical examples.

28. The apparatus of claim 16, wherein the creating graphics comprises the operations of:
extracting at least one composition pattern from the database;
generalizing the at least one composition pattern;
determining whether at least one new composition is valid using at least one generalized composition pattern; and
selecting the most probable valid composition.

29. The apparatus of claim 28, further comprising the operations of:
generalizing at least one negative composition pattern; and determining whether at least one new composition is invalid using at least one generalized negative composition pattern.

30. The apparatus of claim 16, wherein the creating a new sketch comprises the operation of inferring visual decorations.

31. An article of manufacture for automatically generating graphics from a user request, comprising a machine readable medium containing one or more programs which when executed implements:

determining a measure of similarity between the user request and one or more stored graphical examples to measure whether the one or more stored graphical examples are adequate for creating one or more new graphical illustrations in accordance with the user request;

if the user request and the one or more stored graphical examples are similar, searching for at least one matching graphical example among the one or more graphical examples for the user request;

if the user request and the one or more stored graphical examples are not similar, systematically decomposing the user request into sub-requests and the one or more stored graphical examples into graphical fragments in accordance with at least one of syntactic, semantic and pragmatic characteristics of the one or more graphical examples, and searching for at least one matching graphical fragment among the one or more graphical examples for the user request;

composing the one or more new graphical illustrations from at least one of the at least one matching graphical example and the at least one matching graphical fragment, using a pattern-based composition; and storing the one or more composed graphical illustrations in a database for use by the user;

wherein the determining, decomposing, searching and composing steps utilize a cooperative critiquing technique between a user and a system for automated graphics generation.

* * * * *

UNITED STATES PATENT AND TRADEMARK OFFICE
CERTIFICATE OF CORRECTION

PATENT NO. : 7,240,050 B2  Page 1 of 1
APPLICATION NO. : 10/758546
DATED : July 3, 2007
INVENTOR(S) : M.X. Zhou et al.

It is certified that error appears in the above-identified patent and that said Letters Patent is hereby corrected as shown below:

Title Page, Item (56) Ref. Cited, Other Publications:

Line 1 of Reference 2 M. Zhou et al., please delete "Mechine" and insert -- Machine--.

In the Claims:

Claim 1: Col. 9 line 51 please delete "grapfical" and insert --graphical--;

Claim 16: Col. 11 line(s) 43-44 please delete "illustration" and insert --illustrations--.

Signed and Sealed this

Eighteenth Day of September, 2007

JON W. DUDAS
*Director of the United States Patent and Trademark Office*